US010528565B2

United States Patent
Wood et al.

(10) Patent No.: US 10,528,565 B2
(45) Date of Patent: Jan. 7, 2020

(54) LOGICAL LEVEL PREDICTIVE CACHING IN RELATIONAL DATABASES

(71) Applicant: QUEST SOFTWARE INC., Aliso Viejo, CA (US)

(72) Inventors: Daniel T. Wood, Irvine, CA (US); Jan Henrik Jonsson, Long Beach, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 497 days.

(21) Appl. No.: 14/610,259

(22) Filed: Jan. 30, 2015

(65) Prior Publication Data

US 2016/0224556 A1 Aug. 4, 2016

(51) Int. Cl.
  *G06F 16/2455* (2019.01)
  *G06F 16/2453* (2019.01)
(52) U.S. Cl.
  CPC .. *G06F 16/24552* (2019.01); *G06F 16/24539* (2019.01); *G06F 16/24568* (2019.01)
(58) Field of Classification Search
  CPC ........... G06F 17/3048; G06F 17/30457; G06F 17/30516; G06F 16/24552; G06F 16/24568; G06F 16/24539
  USPC ................................................. 707/720, 721
  See application file for complete search history.

(56) References Cited

U.S. PATENT DOCUMENTS

| | | | | |
|---|---|---|---|---|
| 7,185,330 B1* | 2/2007 | Khu | ...................... | G06F 8/4434 717/152 |
| 8,793,158 B2* | 7/2014 | Wee | ........................ | G06Q 30/02 705/14.2 |
| 8,930,918 B2* | 1/2015 | Tendulkar | ............... | G06F 16/21 717/134 |
| 2003/0046673 A1* | 3/2003 | Copeland | ................ | G06F 8/443 717/163 |
| 2007/0226178 A1* | 9/2007 | Ewen | .................. | G06F 16/2453 |
| 2009/0100468 A1* | 4/2009 | Shaffer | .................. | H04N 7/163 725/41 |
| 2009/0187515 A1* | 7/2009 | Andrew | .............. | G06F 16/9535 706/12 |
| 2010/0070516 A1* | 3/2010 | Adler | ........................ | G06F 8/71 707/758 |
| 2010/0082602 A1* | 4/2010 | Ganapathi | ......... | G06F 16/24545 707/718 |
| 2012/0185859 A1* | 7/2012 | Kashiwaya | ......... | G06F 9/30076 718/100 |
| 2013/0060795 A1* | 3/2013 | Plasek | ............... | G06F 16/24534 707/755 |
| 2016/0117333 A1* | 4/2016 | Radinsky | ............... | G06N 5/045 707/706 |

* cited by examiner

*Primary Examiner* — Phong H Nguyen
(74) *Attorney, Agent, or Firm* — Maschoff Brennan

(57) ABSTRACT

A system, method, and computer-readable medium for performing a predictive caching operation in which a hit rate is improved by pre executing statements that are predicted based upon previous use patterns. More specifically, by analyzing a stream of statements provided to a server, such as a database server, patterns of usage are detected and based upon these patterns, statements provided to the server are executed before the actual application executes the predicted statements. Thus the application executes faster because the data requested is already cached based upon the predictive execution.

15 Claims, 4 Drawing Sheets

LOGICAL LEVEL PREDICTIVE CACHING IN RELATIONAL DATABASES

BACKGROUND OF THE INVENTION

Field of the Invention

The present invention relates to information handling systems. More specifically, embodiments of the invention relate to predictive caching in relational databases.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems to store and manage databases such as relational databases (i.e., databases structured to recognize relations among stored items of information). One issue that is important in computer science, such as when storing and managing databases, relates to caching, especially predictive caching. A simple example of predictive caching is when a file is being scanned, a predictive caching operation might assume, based upon a scan of an entire file, that partway through the scan the operation will continue reading the file.

It is also known to use predictive caching for search engines as well as for file systems.

SUMMARY OF THE INVENTION

A system, method, and computer-readable medium are disclosed for performing a predictive caching operation in which a cache hit rate is improved by pre executing statements that are predicted based upon previous use patterns. More specifically, by analyzing a stream of statements provided to a server, such as a database server, patterns of usage are detected and based upon these patterns, statements provided to the server are executed before the actual application executes the predicted statements. Thus, the application executes faster because the data requested is already cached based upon the predictive execution.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
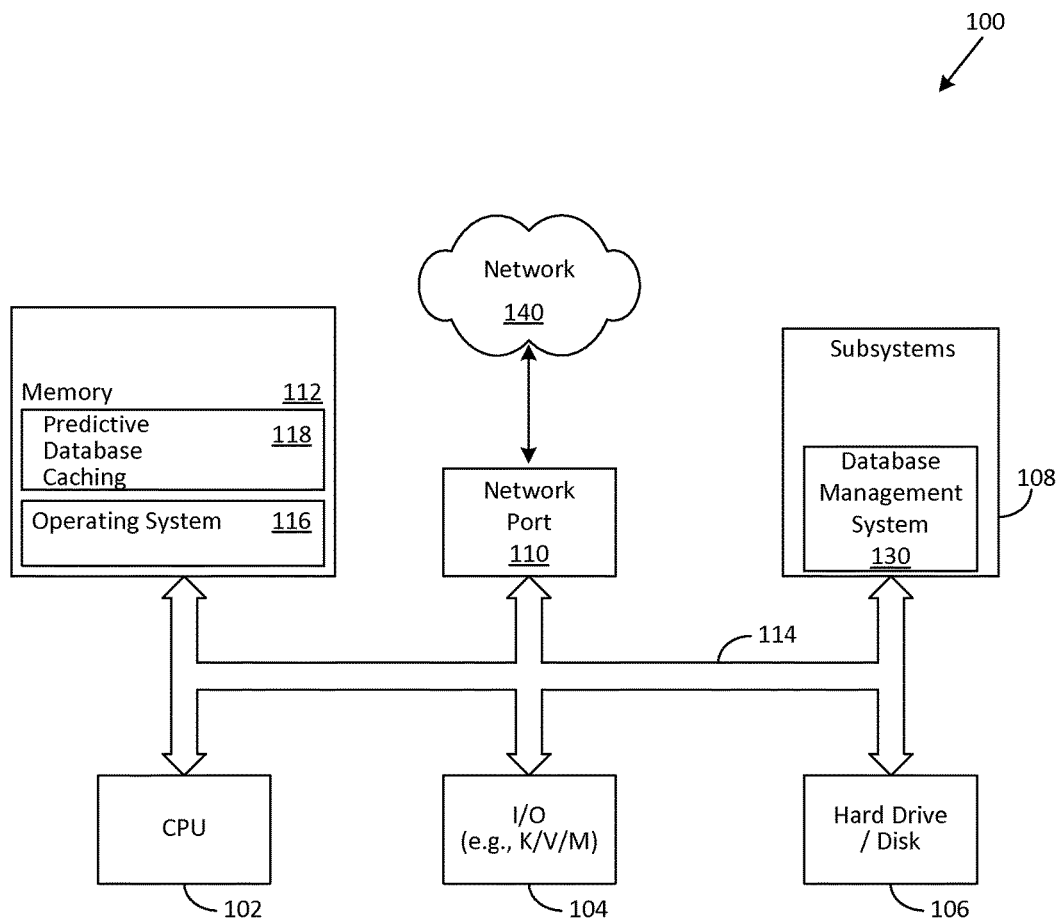
FIG. 1 shows a general illustration of components of an information handling system as implemented in the system and method of the present invention.

FIG. 1 is a generalized illustration of an information handling system 100 that can be used to implement the system and method of the present invention. In various embodiments, the information handling system 100 may correspond to a server type information handling system as well as a database server type information handling system.

The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114.

System memory 112 further comprises operating system (OS) 116 and in various embodiments may also comprise predictive database caching module 118. Additionally, in certain embodiments, the subsystems 108 may comprise a database management system 130. Also, in certain embodiments, the predictive database caching module 118 may be stored within the database management system 130.

The predictive database caching module 118 performs a predictive caching operation in which the cache hit rate when accessing a database is improved by pre executing statements that are predicted based upon previous use patterns. More specifically, by analyzing a stream of statements provided to a server, such as a database server, patterns of statement usage are detected and based upon these patterns, statements provided to the server are executed before the actual application executes the predicted statements. Thus, the application executes faster because the data requested is already cached based upon the predictive execution.

Figure 2:
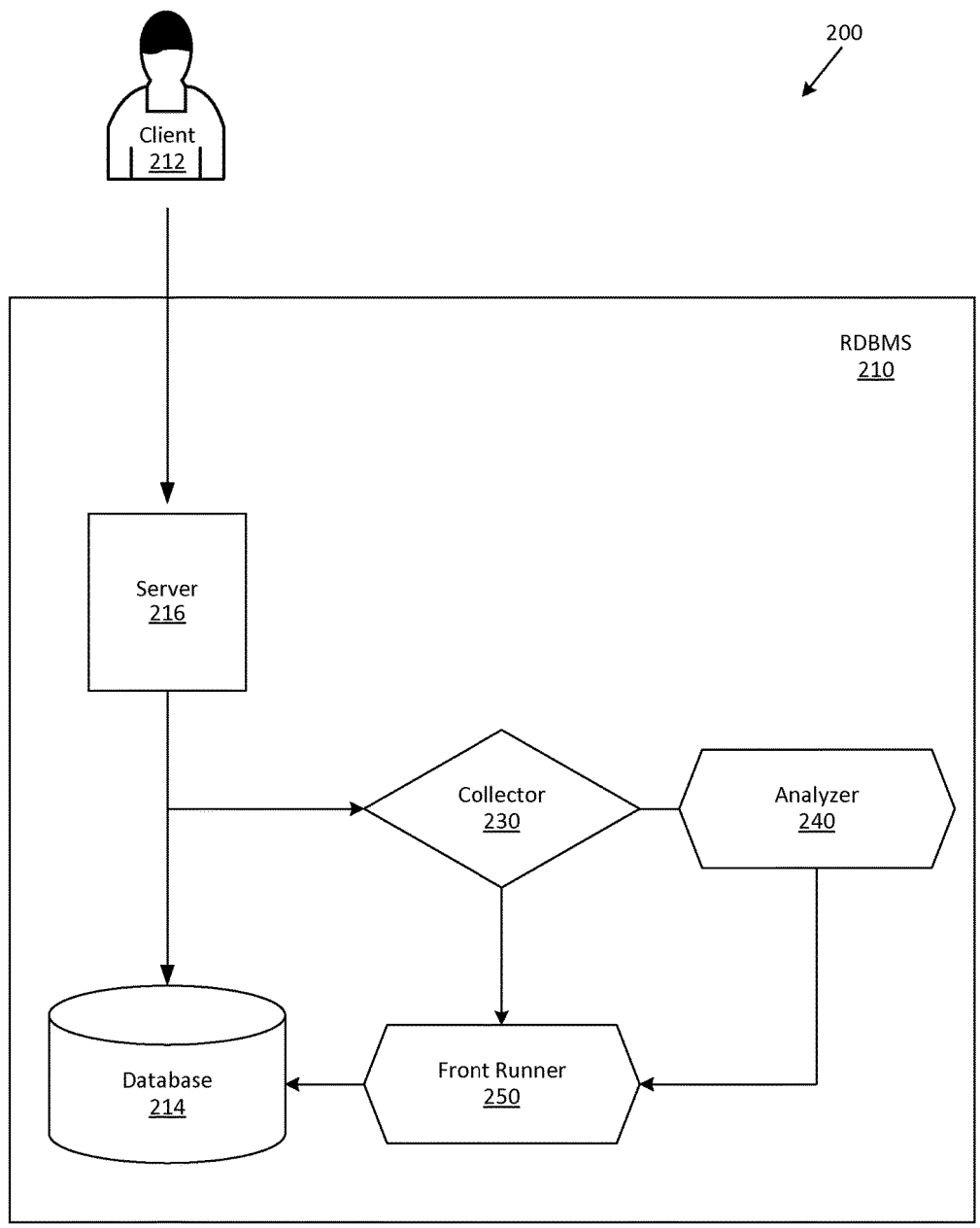
FIG. 2 shows a block diagram of a database environment.

Referring to FIG. 2, a block diagram of a database environment 200 is shown. The database environment 200 includes a relational database management system (RDBMS) 210 which is accessed via one or more relational database management system clients 212. The RDBMS 210 includes a database 214 and a database server 216 coupled to the database 214. The database 214 comprises a collection of data which is organized in such a way to support applications requiring information. In certain embodiments, the database 214 is organized using a database management system that allows the database to interact with the clients, other applications to capture and analyze data. In certain embodiments the database is organized using a Microsoft SQL type organization. The database environment 200 also includes a collector module 230, an analyzer module 240, and a front runner module 250, the combination of which may be considered a predictive database caching system.

The database environment 200 performs a predictive database caching operation at the logical level of the database. The predictive database caching operation is non-database specific and can be applied to different relational database engines.

The collector module 230 identifies statements, such as SQL statements, that are being executed by the relational database management system 210. The analyzer module analyzes a stream of queries, such as a stream of SQL queries, being executed and identifies suitable patterns to be executed by the front runner module. The front runner module 250 executes the identified patterns of queries (i.e., predicted patterns) on the relational database management system 210 as soon as these patterns are identified by the analyzer module 240.

The predictive database caching operation thus increases database efficiency by recognizing that database queries tend to be executed in groups based on the application being executed on top of the database. When a pattern corresponding to a particular group of queries has been detected, the predictive database caching operation increases cache efficiency by executing all the predicted statements in a group as soon as the initial statement or statements of a group has been identified.

The predictive database caching operation is based upon an assumption that a load on the database server is generally not processor bound, but often depends largely on accessing data on a slower storage media. By starting the execution of queries immediately after the first statement of a group has been detected, the predictive database caching operation increases database cache efficiency. When the actual query is received from the RDBMS clients, the data requested is already in the cache of either the server running the database or even better, in the database itself, because if the result of the query is already in the database server, then less processing is necessary to send the result back to the client than if the result is in the system disk cache.

For example, when a business application queries information about a customer, a first query might be a customer status query which is set forth as:
Query 1: SELECT {columns} FROM Customers WHERE CustomerID=:f1

Further to this example, a natural progression (e.g., a next query in the group of queries) might be for the business application to review a particular customer's orders. Subsequent to the customer status query, the application may execute a query for orders which is set forth as:
Query 2: SELECT {columns} FROM Orders WHERE CustomerID=:f1

Without a predictive database caching operation, there is a low likelihood that Query 2 will be returned from a cache hit. It is more likely to be read from the primary media on the server. However, after observing the database queries over time, the predictive database caching operation can determine with reasonable certainty that Query 2 will usually be executed shortly after Query 1. When such a pattern is identified, Query 2 can be initiated by the front runner module 250 as soon as Query 1 is detected. This preemptive execution of the Query will promote Query 2 results to a cache level higher than the primary media of the server. Consequently in due time, when the application intentionally executes Query 2, the results will be returned from a cache hit instead of from the primary media. The database server has performed the same amount of work, but from the application's perspective, the total query time is much less.

Figure 3:
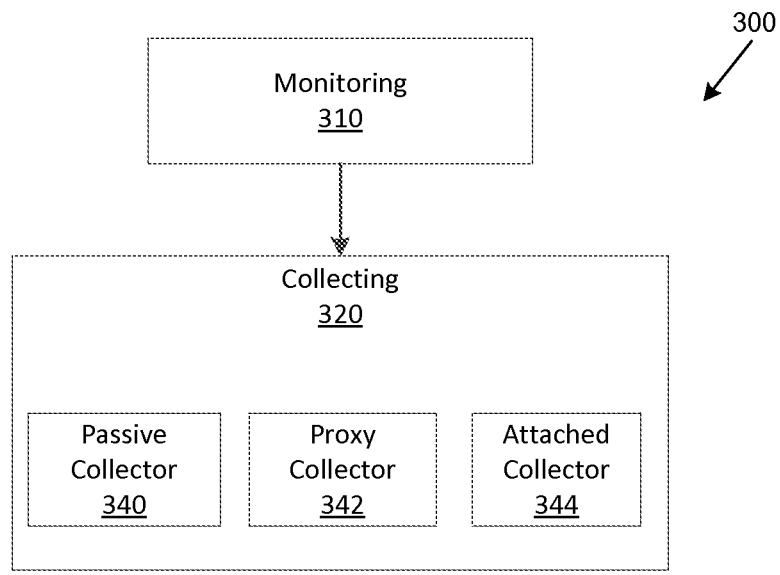
FIG. 3 shows a flow chart of the operation of a collector system.

Referring to FIG. 3, a flow chart of the operation of a collector system 300 is shown. In certain embodiments, the collector module 230 comprises the collector system 300. The collector system 300 performs a monitoring operation 310 and a collecting operation 320. The monitoring operation monitors all statements, such as SQL statements, that are sent to the database by an application. The collecting operation collects all statements, such as SQL statements, that are sent to the database.

When performing the collection operation 310, the collector system 300 collects a plurality of characteristics relating to the statement. More specifically, in certain embodiments, the characteristics include one or more of a query text, any optional bind variables and the bind variable values for the query, a unique identifier for the session to the database, and an amount of time spent executing the query. Also, in certain embodiments, the characteristics include an identifier of the application connecting to the database and generating the statement.

It is important that the query text, any optional bind variables, and the bind variable values for the query be reported as soon as possible. These items should be reported to the front runner module 250 as soon as the collector system 300 obtains the characteristics of the statement, so that the front runner module 250 has the opportunity to quickly start executing predicted statements based upon the incoming stream of statements when the statement is detected.

The unique identifier for the session might not always be able to distinguish between a specific thread of execution due to load balancing and connection pooling that might be used by the application. But in some cases, the unique identifier can assist the analyzer module 240 in determining which statements are executed in sequence.

In various embodiments, the collection system 300 comprises at least one of a plurality of collectors for performing a collection operation 320. The plurality of collectors comprises a passive collector 340, a proxy collector 342, and an attached collector 344.

The passive collector 340 performs a collection operation by listening to network traffic going to and from the server. The listening is performed on the database server itself or even from another server which was able to eavesdrop on the network traffic going to and from the server. It is desirable that this listening have a low latency between the collector module 230 and the RDBMS 210, so that if the listening is performed by another server, this server should be located in close proximity to the database server 216.

The passive collector 340 has an advantage of not requiring any changes in the existing database or client configuration. The passive collector also would generate no extra overhead for the database server 216 or extra latency for the database clients 212. However, the passive collector 340 would generally only function for databases where the over the wire protocol is not encrypted and completely documented. Many databases are not necessarily documented well enough to support such listening. The passive collector also does not allow any ability to delay execution of statements.

With a proxy collector 342, the collector inserts itself between the clients and the RDBMS. When executing a statement, the application would connect to the proxy collector 342, which then forwards the statements to the database 214.

The proxy collector 342 has an advantage of being able to delay execution if needed. The proxy collector 342 also has an advantage of being relatively easy to implement for some database platforms, as there are available libraries for handling proxy communication in database systems. Additionally, the proxy collector 342 will also function in database systems even if communication between clients and database is encrypted. However, the proxy collector 342 may introduce latency in the connection between the database and its clients. Accordingly, it is important that the execution path from receiving a request and passing it on to the database be highly optimized. Additionally, with a proxy collector 342 it is likely that the clients would need to be reconfigured to connect to the proxy instead of the database directly.

With an attached collector 344, the collector attaches to the database process directly such as via a collector application program interface (API) or via a memory scraping operation.

With the collector API, the attached collector 344 is provided with a stream of executing statements such as executing SQL statements.

The collector API type attached collector 344 has an advantage that the collector could also include the stream of statements being executed by internal stored procedures or functions in the database in addition to those received external to the database. The attached collector 344 can also have an advantage of being able to delay execution of statements if needed. This delay may depend on the collector API provided. However, the attached collector 344 would likely require a large effort to support the interface as any API that might exist would probably have the potential to change drastically between minor changes of the database. Also, the attached collector 344 might have the potential to cause the entire database to crash if there was a bug in the collector code. Also, the attached collector 344 would also likely add processing load to the RDBMS process itself.

The memory scraping type attached collector 344 is slightly less intrusive than the collector API type attached collector. The memory scraping type attached collector 344 scrapes any needed information from the database process' memory space. While technically more difficult to perform, the memory scraping type attached collector 344 has the added merit of not introducing a crash risk to the database process.

Figure 4:
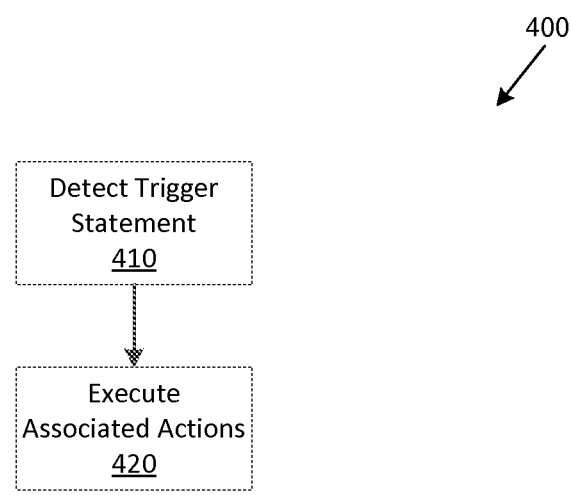
FIG. 4 shows a flow chart of the operation of a front runner system.

Referring to FIG. 4, a flow chart of the operation of a front runner system 400 is shown. In certain embodiments, the front runner module 250 comprises the front runner system 400.

The front runner system 400 receives rules from the analyzer module 240. A rule includes a trigger statement and associated actions. In certain embodiments, the associated actions include instructions to execute one or more statements such as known SQL statements. The front runner system 400 receives a stream of statements from the collector module 230. When the front runner system 400 detects a trigger statement in the stream from the collector module 230 at step 410, the front runner system 400, not needing to wait for the result of the executed query, any client application processing or network latency, substantially immediately (i.e., executing faster than if network response of a result from an executed query) executes the associated actions at step 420. The execution of the associated actions is via a front runner connection or connections to the database 214. The front runner system 400 does not generally worry about anything except monitoring for trigger statements (which may be defined within a front runner trigger set of statements) and in as short a matter of time as possible, execute the associated SQL statements to the database. In certain embodiments, the front runner system 400 does not store any results returned by the executed statements.

In certain embodiments, the analyzer module 240 can add, change and/or revoke rules for the front runner system 400. It is desirable that the rules themselves be as simple as possible to minimize any time spent analyzing a statement to determine whether the statement is a trigger statement.

One goal of the predictive database caching operation is to increase performance of the RDBMS 210. Accordingly, it is desirable to avoid race conditions where the front runner system 400 is executing the same query as the application. In certain embodiments, if the collector module 230 supports delaying executions, then when the front runner system 400 is executing a predicted statement, the front runner system 400 can optionally indicate this execution to the collector module 300 so that the collector module 230 may delay the execution of this exact statement by the RDBMS until the front runner system 400 completes the execution of the statement. Such an operation can lead to higher performance in the RDBMS 210 because the RDBMS 210 can cache the result of a query once the statement has finished executing instead of executing two exact queries at almost the same time. However, even if the two queries do end up executing in parallel, the time spent by the RDBMS to fetch blocks from slow storage media into cache should still be saving total time to execute the query for the clients.

Figure 5:
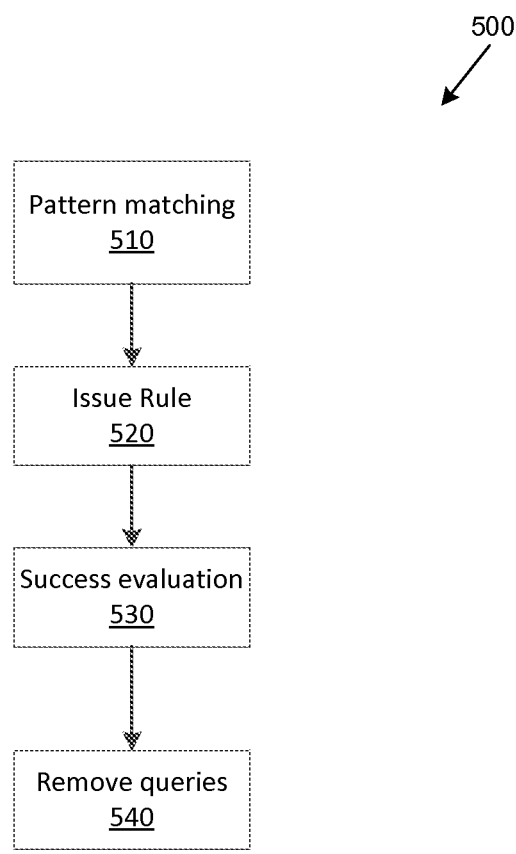
FIG. 5 shows a flow chart of the operation of an analyzer system.

Referring to FIG. 5, a flow chart of the operation of an analyzer system 500 is shown. In certain embodiments, the analyzer module 240 comprises the analyzer system 500. One key aspect of the analyzer system 500 though is that analyzer system 500 does not have to operate in real time. The analyzer system 500 processes the stream of incoming executing queries and when a pattern is detected, the analyzer system 500 informs the front runner module 250 to start looking for and executing the pattern as quickly as possible.

In certain embodiments, the analyzer system 500 performs a simple pattern matching operation 510. For example, a common pattern for database access is that an application obtains a detail record for a certain entity following several successive queries to other tables to obtain additional data for that entity.

For example, in an application showing information about a customer, an application could conceivably first generate a query for information for a specific customer. For example, when a business application queries information about a customer, a first query might be a customer status query which is set forth as:

SELECT {columns} FROM Customers WHERE CustomerID=:f1

Further to this example, a natural progression (e.g., a next query or pattern of queries in the group of queries) might be for the business application to review a particular customer's orders. Subsequent to the customer status query, the application may execute a query for orders which is set forth as:

SELECT {columns} FROM Orders WHERE CustomerID=:f1

Where the bind variable would specify the customer ID. This is then followed by the query to fetch all the recent orders that this customer has placed, and finally the latest interactions with this user, where the queries are set forth as:

SELECT {columns} FROM Calls WHERE CustomerID=:f1

In this example, if the analyzer system 500 determines that almost every time the initial query was executed with a certain parameter value (or if the analyzer system 500 determines that the query is a constant), the following two statements would execute with the same value (thus presenting a pattern of queries). The analyzer system 500 would issue a rule at step 520 for the front runner module 250 to start monitoring for the exact initial query and when detected, immediately issue the next two queries.

When the client application comes around to executing the two final statements, the data for this query is already in cache on the database server and a thus the response to the query is faster. One reason the predictive database caching operation provides a faster response to the follow-on queries is that the client does not generally execute the follow up statements until the result from the first query has been returned.

Because the follow-on queries are generally not executed until the result is received, the front runner module 250 has a several millisecond time advantage to execute the predicted queries before the actual queries are received from the client application.

Another aspect of the analyzer system 500 is that once a pattern has been identified and passed on to the front runner module 240, the analyzer system 500 performs ongoing success evaluation operations at step 530 by evaluating execution patterns after the front runner module 250 has started trying to help execution time. If no measurable improvement is detected (or worse, a degradation) the analyzer system 500 removes the pattern from those that are included within the predicted queries at step 540. This removal operation can also aid in preventing race conditions between the front runner module 250 and the business application. If with a particular predicted set of queries, the front runner module 250 induces a race, the overall query time will degrade, resulting in the analyzer system 500 either modifying the rule associated with the trigger statement or revoking the rule from the front runner module altogether.

In certain embodiments, the success evaluation operation is expanded with periodic intervals disabling (or removing) individual patterns from the front runner module 250 to obtain benchmarks for what the unassisted performance is to assure that the front runner module 250 is not causing extra load on the database without actually improving overall performance. Once a new baseline time of execution has been established, the original pattern can be enabled or added again.

In a database environment where a plurality of database servers are used to execute the database, a predictive database caching system, including respective collector modules and front runner modules is provided for each database server in the cluster. However, as long as all the database servers in the cluster are executing with substantially similar workloads (so the access patterns are the same) the predictive database caching system may share a single analyzer module 240 between the entire cluster. With a single analyzer module 240, once a pattern is identified on one predictive database caching system, it can be applied immediately on all the other predictive database caching systems of the cluster.

Using this approach with several database servers also helps with the continual evaluation because the temporary disabling of rules to calibrate the performance can be performed on a rotating machine basis so that the overall performance of the cluster is less significantly affected by the disabling.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method to perform a predictive caching operation, the method comprising:
    analyzing a stream of statements provided to a database server;
    determining a pattern of usage within the stream of statements;
    determining, within a predetermined level of certainty, that the pattern of usage includes a first statement that will be executed after a second statement;
    predictively pre-executing the first statement on the database server based on the pattern of usage within the stream of statements so as to improve performance of the server when executing the stream of statements, wherein predictively pre-executing the first statement comprises receiving rules relating to the stream of statements, each rule comprising a trigger statement and associated actions;
    providing the pre-executed first statement for storage in a cache that is accessible to an application; and
    upon detecting the first statement, retrieving the pre-executed first statement from the cache and initiating execution of the second statement.

2. The method of claim 1, further comprising:
    monitoring statements that are sent to the database server by an application; and,
    collecting the statements that are sent to the database server.

3. The method of claim 2, wherein:
    the collecting further comprises collecting a plurality of characteristics relating to each statement, the plurality of characteristics comprising one or more of a query text, any optional bind variables and bind variable values for the query, a unique identifier for a session to the database and an amount of time spent executing the query.

4. The method of claim 1, wherein:
    the analyzing comprises processing the stream of statements and detecting patterns of execution within the stream of statements.

5. The method of claim 4, wherein determining the patterns of usage further comprises performing a pattern matching operation, the pattern matching operation recognizing that an application obtains a detail record for a certain entity following several successive queries to obtain additional data for that entity.

6. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor to perform operations comprising:
        analyze a stream of statements provided to a database server;
        determine a pattern of usage within the stream of statements;
        determine, within a predetermined level of certainty, that the pattern of usage includes a first statement that will be executed after a second statement;
        predictively pre-execute the first statement on the database server based on the pattern of usage within the stream of statements so as to improve performance of the server when executing the stream of statements, wherein predictively pre-executing the first statement comprises receiving rules relating to the stream of statements, each rule comprising a trigger statement and associated actions;
        provide the pre-executed first statement for storage in a cache that is accessible to an application; and
        upon detecting the first statement, retrieve the pre-executed first statement from the cache and initiate execution of the second statement.

7. The system of claim 6, wherein the instructions are further configured to cause the processor to perform operations comprising:
    monitor statements that are sent to the database server by an application; and;
    collect statements that are sent to the database server.

8. The system of claim 7, wherein execution of the instruction to collect causes the processor to:
    collect a plurality of characteristics relating to each statement, the plurality of characteristics comprising one or more of a query text, any optional bind variables and bind variable values for the query, a unique identifier for a session to the database and an amount of time spent executing the query.

9. The system of claim 6, wherein execution of the instruction to analyze causes the processor to:
   process the stream of statements and detect patterns of execution within the stream of statements.

10. The system of claim 9, wherein execution of the instruction to determine the pattern of usage causes the processor to:
   perform a pattern matching operation, the pattern matching operation recognizing that an application obtains a detail record for a certain entity following several successive queries to obtain additional data for that entity.

11. A non-transitory, computer-readable storage medium embodying computer program code, the computer program code comprising computer executable instructions configured to cause a processor to perform operations comprising:
   analyze a stream of statements provided to a database server;
   determine a pattern of usage within the stream of statements;
   determine, within a predetermined level of certainty, that the pattern of usage includes a first statement that will be executed after a second statement;
   predictively pre-execute the first statement on the database server based on the pattern of usage within the stream of statements so as to improve performance of the server when executing the stream of statements, wherein predictively pre-executing the first statement comprises receiving rules relating to the stream of statements, each rule comprising a trigger statement and associated actions;
   provide the pre-executed first statement for storage in a cache that is accessible to an application; and
   upon detecting the first statement, retrieve the pre-executed first statement from the cache and initiating execution of the second statement.

12. The non-transitory, computer-readable storage medium of claim 11, wherein the computer executable instructions are further configured to cause the processor to:
   monitor statements that are sent to the database server by an application; and,
   collect statements that are sent to the database server.

13. The non-transitory, computer-readable storage medium of claim 11, wherein:
   when collecting the statements that are sent to the database server, the processor is configured to collect a plurality of characteristics relating to each statement, the plurality of characteristics comprising one or more of a query text, any optional bind variables and bind variable values for the query, a unique identifier for a session to the database and an amount of time spent executing the query.

14. The non-transitory, computer-readable storage medium of claim 11, wherein:
   when analyzing the stream of statements provided to the database server, the processor is configured to process the stream of statements and detect patterns of execution within the stream of statements.

15. The non-transitory, computer-readable storage medium of claim 14, wherein:
   when determining the pattern of usage, the processor is configured to perform a pattern matching operation, the pattern matching operation recognizing that an application obtains a detail record for a certain entity following several successive queries to obtain additional data for that entity.

* * * * *